United States Patent [19]

Oshima

[11] 4,308,928

[45] Jan. 5, 1982

[54] AUTOMATIC COMBINATION WEIGHING MACHINE

[75] Inventor: Yashushi Oshima, Akashi, Japan

[73] Assignee: Yamato Scale Company Limited, Hyogo, Japan

[21] Appl. No.: 164,315

[22] Filed: Jun. 30, 1980

[51] Int. Cl.³ .................... G01G 19/04; G01G 13/00; G01G 13/16; G01G 13/02

[52] U.S. Cl. ........................... 177/25; 177/54; 177/59; 177/123

[58] Field of Search .................. 177/1, 25, 54, 59, 123

[56] References Cited

U.S. PATENT DOCUMENTS

| | | | |
|---|---|---|---|
| 2,470,916 | 5/1949 | Carruthers | 177/1 X |
| 2,687,271 | 8/1954 | Carter | 177/54 |
| 2,802,658 | 8/1957 | Hensgen et al. | 177/1 |
| 3,557,889 | 1/1971 | Rejsa | 177/123 X |
| 3,708,025 | 1/1973 | Soler et al. | 177/1 |
| 3,939,928 | 2/1976 | Murakami et al. | 177/1 X |
| 4,206,822 | 6/1980 | Mazzucchelli | 177/25 |
| 4,267,894 | 5/1981 | Hirano et al. | 177/25 |

*Primary Examiner*—George H. Miller, Jr.
*Attorney, Agent, or Firm*—Eugene E. Geoffrey, Jr.

[57] ABSTRACT

An automatic weighing machine, used for dividing articles having substantial variance in their weights into groups, each group consisting of a plurality of said articles and having a total weight within a predetermined allowable range, wherein the articles are weighed one by one or group by group by a single weighing device and, then, retained one by one or group by group in retaining hoppers arranged in a circle and, at the same time, the measured weights are stored in separate memories, respectively, the contents of these memories are read out in accordance with predetermined combinations and summed up, the sum is compared with the predetermined allowable range and, when it is within said range, the gates of the retaining hoppers corresponding to the instant combination are opened to collect the contents thereof.

5 Claims, 4 Drawing Figures

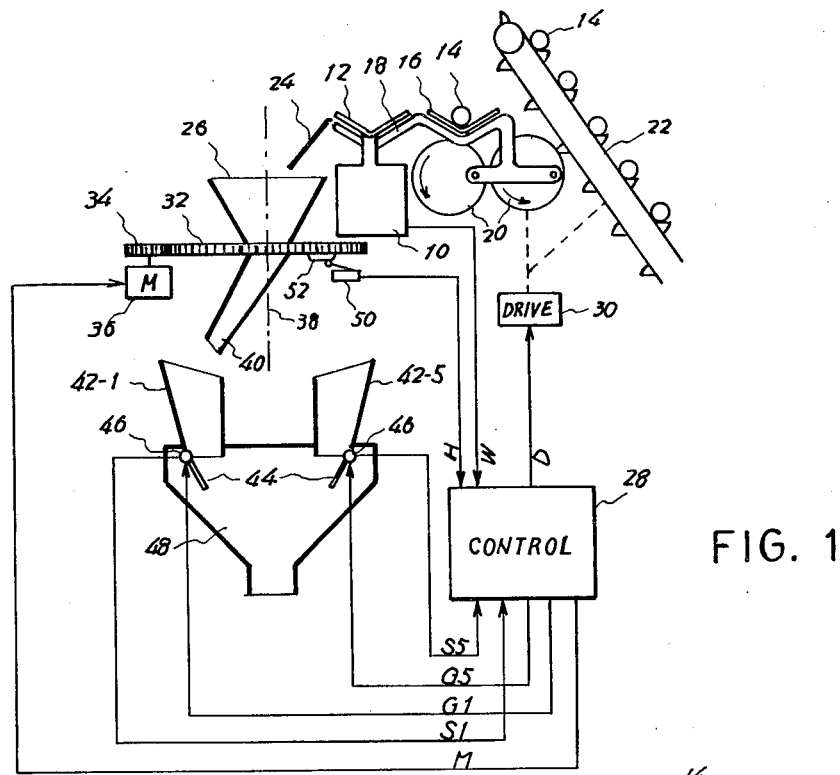
FIG. 1
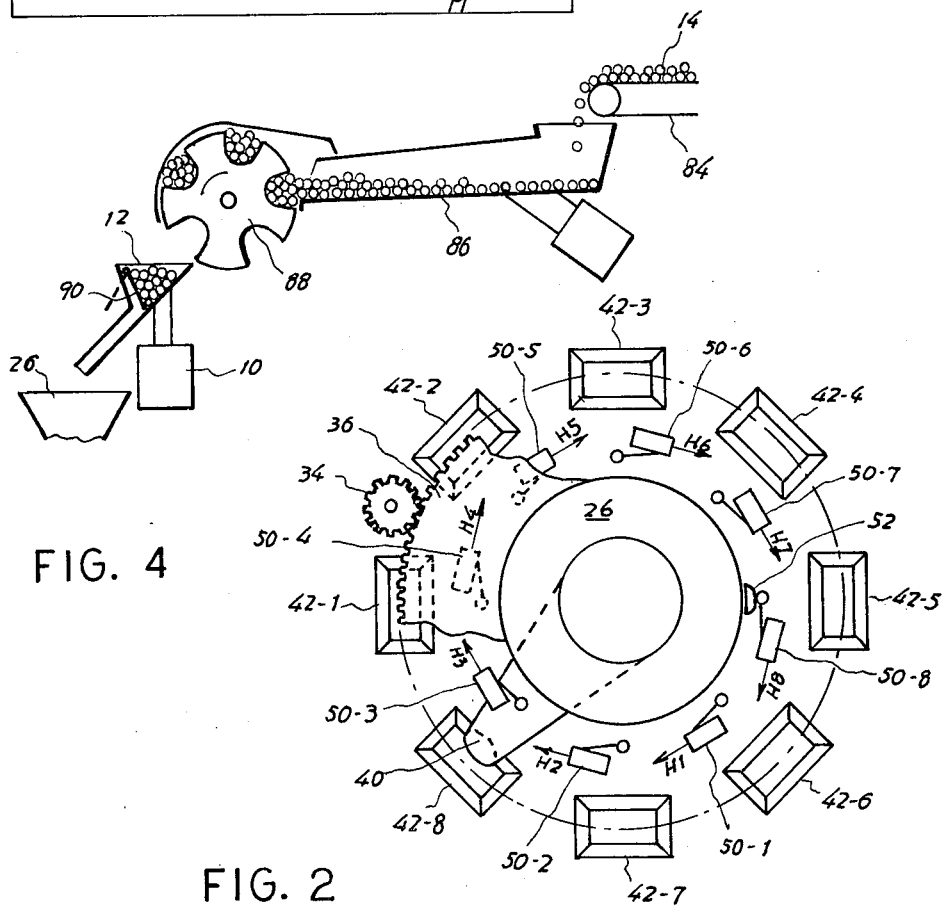
FIG. 4
FIG. 2

AUTOMATIC COMBINATION WEIGHING MACHINE

This invention relates to an automatic combination weighing machine, which is used in instances wherein a plurality of articles are packed together with each pack having nearly constant weight.

The weighing device which is generally referred to as a "combination balance" or "combination weighing device" is used for extracting and collecting a plurality of articles from a group of articles, such as cakes, fishes and vegetables, having relatively large variances in respective weights, so that the extracted group has a weight which is nearly equal to a predetermined intended weight. A typical example of such a device is disclosed in U.S. Pat. No. 3,939,928, and another example which is improved over that U.S. patent in arithmetic arrangement is described in the pending U.S. patent application Ser. No. 102,660 filed Dec. 12, 1979. In those devices, a plurality of articles are weighed individually by the same number of weighing balances at the same time. All mathematical combinations of the respective weights are summed respectively and the respective sums are subtracted from the intended weight to obtain corresponding deviations. Thus, the combination providing the least deviation is selected. However, those devices must be provided with a plurality of weighing balances, the number of which is equal to the number of the articles contained in each pack. Therefore, they become more expensive with increases in the number of articles.

Accordingly, an object of this invention resides in the provision of an improved combination weighing device which needs only one weighing balance regardless of the number of articles in each pack.

Another object of this invention resides in the provision of an automatic combination weighing machine which can effect such grouping continuously and efficiently in automatic fashion.

According to this invention, the automatic combination weighing machine includes a single weighing device for weighing an article or a group of articles to generate a signal representative of the weight thereof and a plurality of memories for storing the weight-representative signals successively supplied from the weighing device. The weighing device includes means for feeding the articles one by one or group by group to the weighing device. A plurality of retaining hoppers are arranged in correspondence respectively to the memories and means are provided for transferring the articles successively from the weighing device into the respective hoppers. Each hopper has a normally closed gate at the bottom, which is opened temporarily in response to a gating signal from a combination memory. The outputs of the respective memories are coupled through respective normally open switches to an arithmetic unit which is arranged to sum up its inputs, subtract the sum from a predetermined value and produce an output when the difference is in a predetermined range. A switch control device is provided for closing certain of the normally open switches selected in accordance with a plurality of predetermined combinations. The combination outputs for controlling the switches are also supplied successively to and stored temporarily in the combination memory which produces a combination of gating signals for the hoppers in response to the output of the arithmetic unit.

These and other objects and features of this invention will be described in more detail hereinunder with reference to the accompanying drawings.

IN THE DRAWINGS

FIG. 1 is a schematic side view of an embodiment of the automatic combination weighing machine according to this invention and represents one arrangement of its structural components;

FIG. 2 is a schematic plan view showing the arrangement of the retaining hoppers of the embodiment of FIG. 1;

FIG. 4 is a schematic side view representing another embodiment of the article feeding mechanism applicable to the system of this invention.

Throughout the drawings, like reference symbols are used to denote corresponding structural components.

Figure 3:
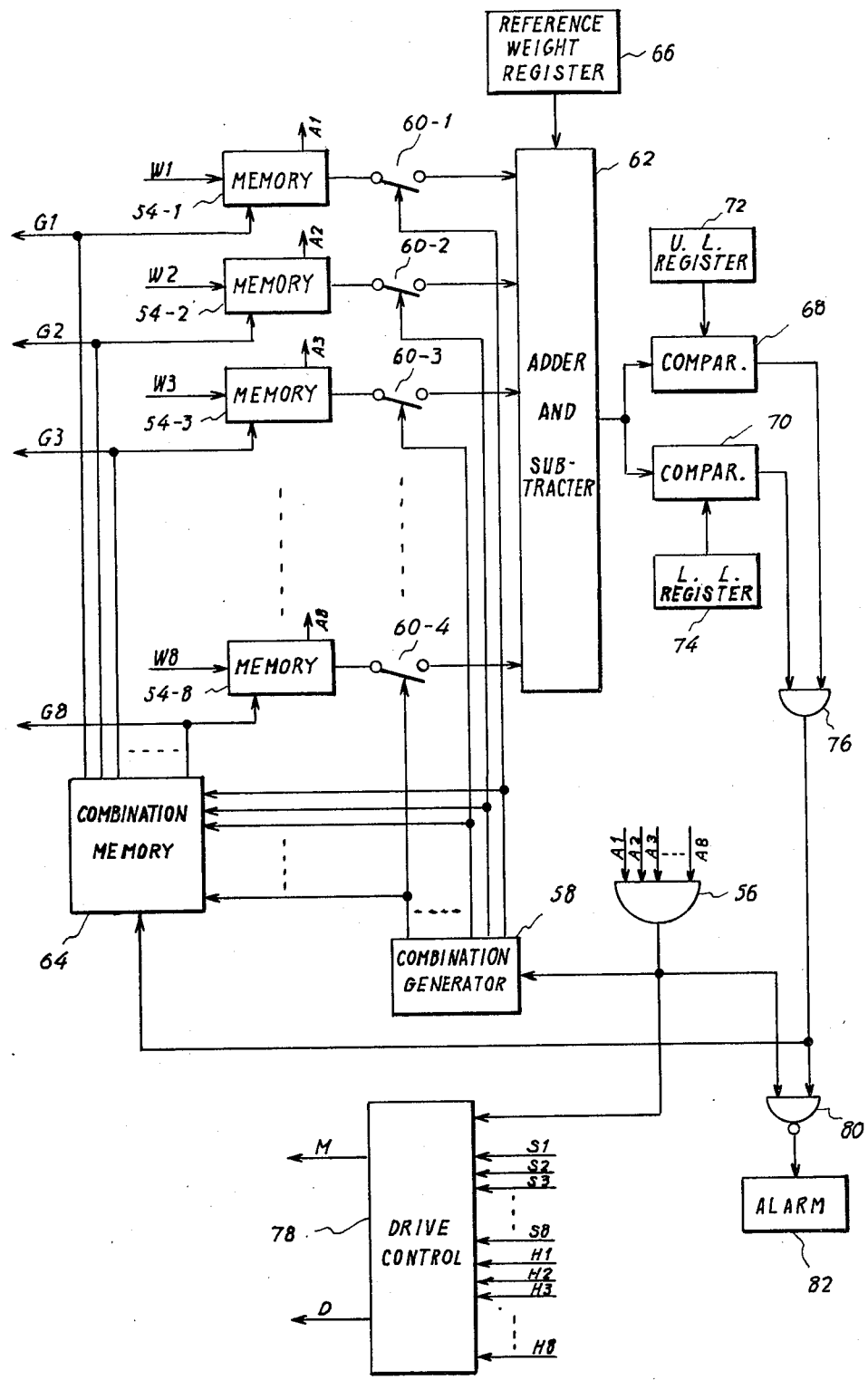
FIG. 3 is a block circuit diagram of the control system of the embodiment of FIGS. 1 and 2.

Referring to FIG. 1, the machine includes a weighing device 10 having a weighing cradle 12 for weighing articles 14 transferred one by one from an adjoining receptacle 16 by a wavy transferring arm 18 which is moved by a pair of wheels 20 rotating synchronously in the same direction as shown. The articles 14, having generally a substantial variance in their weights, are fed sequentially onto the receptacle 16 by a basket conveyer 22 and then transferred in turn by the arm 18 through the cradle 12 and a ramp 24 into a shoot 26. The weighing device 10 produces successively electric signals (W) indicative of the weights of articles and sends them to a control system 28. The wheels 20 and the conveyor 22 are driven synchronously by a driving mechanism 30 which is controlled by a control signal (D) from the control system 28.

In FIGS. 1 and 2, the shoot 26 is fixed centrally to a large toothed wheel 32 which meshes with a pinion 34 driven by a reversible motor 36, so that it can be rotationally driven about its central axis 38 under control of a control signal (M) supplied from the control system 28 to the motor 36. The shoot 26 has a lower outlet 40 angularly deviating from the central axis 38 to successively face the eight retaining hoppers 42-1, 42-2, 42-3, . . . 42-8 as the wheel 32 rotates, the hoppers being arranged circularly at equal intervals under the shoot 26. Each hopper 42 has a normally closed gate 44 at the bottom (shown as opened) and a sensing and control unit 46 adapted thereto. The unit 46 includes a load sensing element, such as load cell, and supplies a sensing signal (S) to the control system 28 when an article 14 is present in the hopper. The unit 46 also includes a gate control device, such as electromagnet, actuated by a gating signal (G) from the control system 28 to open the gate 42 for a preset short period of time to discharge the article in the hopper. The gates 44 of all hoppers 42 open in a common collecting shoot 48 and the articles from the hoppers are collected therein together and discharged downwardly for packing. Corresponding to the eight retaining hoppers 42, eight micro-switches 50-1, 50-2, 50-3, . . . 50-8 are arranged circularly and successively actuated by the moving element 52 which is fixed to the toothed wheel 32 to be moved with the shoot 26, and can send a signal (H) to the control system 28 which is indicative of the hopper 41 faced at that time by the outlet 40 of the shoot 26.

Referring to FIG. 3 representing the main portion of the control system 28, the weight signals W1, W2, W3, . . . W8 produced sequentially by the weighing device 10 are supplied through a switching device (not shown), such as rotary switch, to memories 54-1, 54-2, 54-3, ... 54-8, sequentially. The memories 54-1, 54-2, 54-3, ... 54-8 are arranged to produce control signals A1, A2, A3, ... A8, respectively, when they received their contents, which are applied to an AND gate 56. The AND gate 56 produces an output to actuate a combination generator 58 when all memories 54 are filled. The combination generator 58 has eight outputs respectively coupled to the control inputs of eight normally open switches 60-1, 60-2, 60-3, ... 60-8 which couple respectively the outputs of the memories 54-1, 54-2, 54-3, ... 54-8 to an adder and subtractor 62.

The combination generator 58 is a device for successively producing all mathematical combinations of the outputs numbering $2^n - 1$ in total if the number of outputs is n, therefore $2^8 - 1 = 255$ in this example, and closing switches 60 in accordance with these combinations. Although various circuit configurations can be considered by those skilled in the art for the combination generator 58, an example which is relatively simple is an n-bit (8-bit, in this embodiment) binary counter which is driven by a suitable clock generator (not shown). When the parallel outputs derived from the respective bits of the counter are coupled respectively to the control inputs of the switches 60 and the switches are arranged to close in response to binary "1" inputs for example, the switches 60 will encounter all combinations of actuation during progression of count from zero to the greatest or full count. The outputs of the combination generator 58 are also applied successively to a combination memory 64 and stored temporarily therein.

The contents of the memories 54 supplied through the actuated switches 60 to the adder and subtractor 62 are summed up and then subtracted from the preset content of a reference weight register 66 to obtain a plus or minus deviation from a predetermined reference weight in the adder and subtractor 62. The deviation output of the adder and subtractor 62 is applied to a pair of comparators 68 and 70 and compared with allowable upper and lower deviations which are respectively preset in upper and lower registers 72 and 74. The comparators 68 and 70 are arranged to produce signals when the input deviations are within the preset limits. When both comparators 68 and 70 produce outputs at the same time, an AND gate 76 receives them and produces an output. This output is coupled to the trigger input of the combination memory 64 to cause it to exhaust its content of corresponding gating signals (G) which are in turn applied to the control units 46 (FIG. 1) of the corresponding retaining hoppers 42 to open their gates 44. Thus, a set of hoppers 42 specified by the allowable combination exhaust their contents into the collecting shoot 48 for packing. The gating signals (G) are also applied to reset inputs of the corresponding memories 54 to reset their contents.

When the retaining hoppers 42 exhaust their contents, their sensing units 46 supply vacancy signals to a drive control unit 78. Then, the drive control unit 78 supplies a motor control signal (M) to the motor 34 to drive the shoot 26 so that its outlet 40 is sequentially directed to the vacant hoppers 42, in cooperation with the microswitches 50 which supply outlet position signals (S) to the control unit 78. At the same time, the drive control unit 78 supplies a drive signal (D) to the driving mechanism 30 to drive the conveyer 22 and the transferring arm 18 so that additional articles 14 are successively weighed by the weighing device 10 and then discharged into the vacant hoppers 42, respectively. When the vacant hoppers 42 and also the reset memories 54 corresponding thereto are thus filled again, the AND gate 56 produces an output to disable the drive control unit 78 and again actuate the combination generator 58. Thus, a new cycle of operation is initiated and the same procedure as aforementioned is repeated. As the pattern of drive control is often used in various technical fields and the circuit configuration of the drive control unit 78 can be designed arbitrarily by those skilled in the art, no further detailed description of the unit 78 will be provided.

If there was no combination of articles in the hoppers 42 the total weight of which came within the predetermined range, no output is produced from the AND gate 76. Therefore, a NAND gate 80, the inputs of which are respectively coupled to the outputs of the AND gates 76 and 56 produces an output and applies it to an alarm unit 82, such as lamp or buzzer, to actuate the same. In this case, the operator may stop the machine, remove the articles manually from all hoppers and then repeat the operation. It is also understood that the alarm unit 82 is also actuated when on output is produced from the AND gate 56 due a vacancy existing among the memories 54.

Although, in this embodiment, eight (8) retaining hoppers 42 and corresponding memories 54 and other components are used, it should be noted that this number is only for illustrative purposes and can be selected optionally as occasion demands. Though the embodiment of FIG. 1 has been shown and described as the articles are weighed one by one and each hopper retains a single article, this invention is also applicable to a case where the articles to be packed are relatively small in size, particulate or powdered and weighed and retained group by group. FIG. 4 shows an example of article feeding mechanism which can be used in such a case. As shown in the drawing, particulate articles 14 are transferred by a belt conveyor 84 and a vibration conveyor 86 to a rotary feeder 88, which divides the articles 14 into groups successively and discharges each group in the hopper-like cradle 12 of the weighing device 10. The cradle 12 has a controlled gate 90 which is opened periodically to send the content to the shoot 26. The remainder of the operation is the same as that of the embodiment of FIG. 1. Furthermore, instead of the alarm unit 82 in the embodiment of FIG. 3, logic means may be provided for searching a combination which gives a total weight which is outside but nearest the allowable range and opening the corresponding gates of the hoppers, so that the operation is continued automatically without interruption.

What is claimed is:

1. An automatic combination weighing machine, comprising a plurality of retaining hoppers arranged in a circle, each of said hoppers having a normally closed gate at the bottom, which is opened temporarily in response to a gating signal, a shoot rotatably supported about the central axis of said circle, whereby the outlet of said shoot can face the inlet of any of said hoppers, means for intermittently rotating said shoot to cause said outlet to face sequentially the inlets of said hoppers, a single weighing device for weighing an article to be weighed and producing a weight output indicative of the weight of said article, means for feeding a plurality of articles to be weighed sequentially one by one or group by group and then discharging them into said shoot in synchronism with the rotation of said shoot, a plurality of memories corresponding respectively to said hoppers, means for supplying said weight signal sequentially to said memories in synchronism with the rotation of said shoot, arithmetic means for summing up combination inputs of said memories and producing an output when the sum has a value within a predetermined range, a plurality of normally open switches for coupling the outputs of said memories respectively to the inputs of said arithmetic means, switch control means coupled to the control inputs of said switches for selectively closing said switches in accordance with predetermined combinations, and a temporary memory for successively storing the output of said switch control means and applying the content at that time to the reset inputs of said respective memories as reset signals and, at the same time, to the gates of said respective hoppers as said gating signals in response to the output of said arithmetic means, thereby clearing said memories corresponding to said closed switches and, at the same time, opening the gates of said hoppers corresponding to said memories.

2. An automatic combination weighing machine, according to claim 1, wherein said switch control means comprises a binary counter having bit outputs coupled respectively to the control inputs of said normally open switches, and a clock pulse generator coupled to the input of said counter.

3. An automatic combination weighing machine, according to claim 1, wherein said intermittent rotating means includes means for detecting lack of the contents of said retaining hoppers to produce vacancy signals, and means for rotating said shoot in response to said vacancy signal until the outlet of said shoot faces said vacant hopper.

4. An automatic combination weighing machine, according to claim 1, wherein said memories are arranged to produce pilot outputs indicative of existence of their contents in response to the writing-in of the contents thereof, respectively, and an AND circuit having inputs respectively coupled to said pilot outputs of said memories, said switch control means being arranged to initiate operation in response to the output of said AND circuit.

5. An automatic combination weighing machine, according to claim 4, including a NAND circuit having inputs coupled respectively to the outputs of said AND circuit and said arithmetic means, and alarm means actuated by the output of said NAND circuit.

* * * * *